DOMAIN ROTATIONAL MEMORY SYSTEM

Filed Oct. 8, 1956 5 Sheets-Sheet 1

INVENTOR
LLOYD P. HUNTER
BY Joseph J. Connerton
ATTORNEY

DOMAIN ROTATIONAL MEMORY SYSTEM

Filed Oct. 8, 1956 5 Sheets-Sheet 5

United States Patent Office 3,093,818

Patented June 11, 1963

3,093,818

DOMAIN ROTATIONAL MEMORY SYSTEM

Lloyd P. Hunter, Poughkeepsie, N.Y., assignor to International Business Machines Corporation, New York, N.Y., a corporation of New York Filed Oct. 8, 1956, Ser. No. 614,654
18 Claims. (Cl. 340—174)

The present invention is directed toward a storage and selection system and more particularly to a storage and selection for digital information employing a magnetic material having specific hysteresis characteristics and arranged in multicoordinate groupings.

In memory systems of the prior art employing magnetic elements of metallic or ferrite material having a substantially rectangular hysteresis characteristic, such as magnetic cores, the process of switching from one magnetic state of the element to the other by reversing an external magnetic field applied to the element is accomplished by domain wall motion. The magnetic states in such elements are identified by the direction of magnetization of the element. When the external magnetic field applied to such an element is reversed, a corresponding reversal in the direction of magnetization of the element proceeds by the initial formation of small regions or domains with reversed magnetization separated by domain walls from the remainder of the material. If the reversed external field is maintained, these walls will progress through the material in such directions that the small regions of reversed magnetization will grow at the expense of the regions in which the magnetization remains opposed to the external field. The domain wall motion will proceed until all of the magnetic vectors of the material are aligned in the direction of the reversed external field, the interval required for this domain wall progression determining the switching time of the element.

From the above description, it will be appreciated that one disadvantage associated with domain wall switching is that a substantially long time interval with respect to high speed switching circuits of the relative order of 0.5 to 5.0 microseconds, may be required to switch a magnetic element such as a core by domain wall progression, the exact time varying according to factors such as the size, composition and shape of the magnetic material, driving power applied, etc.

In accordance with the present invention there is provided a high speed storage or memory device comprising storage elements of thin magnetic film which are of insufficient thickness to support domain walls wherein switching takes place by the simultaneous rotation of substantially all magnetic particles or vectors in the film rather than through domain wall motion. Thus magnetization reverses by simple rotation in the manner of a compass needle rather than by successive stages in the material, and takes place at a much more rapid rate than domain wall motion. This magnetic film is so fabricated that it contains a single axis of easy magnetization, this axis consisting of two directions of easy magnetization at an angular displacement of 180°. Basically, thin film is a polycrystalline material of nickel iron alloy which when fabricated under the influence of an external magnetic field results in uniaxial anisotropy along a bi-directional axis. In such material, the magnetic domains of the individual crystal are aligned in one or the other direction along this axis, as compared to the random orientation or alignment of conventional magnetic storage mediums such as magnetic cores. This axis in magnetic film is designated as the axis of easy magnetization and the term "easy" designates the anisotropic characteristics of the thin magnetic film. With respect to the thin film storage elements, for purposes of illustration the easy direction of magnetization may be arbitrarily determined to be the longitudinal direction. Employed for storage purposes, the two easy directions of magnetization may be arbitrarily designated as binary one and zero, respectively, or vice versa.

In addition to the above described characteristics, a unique phenomenon associated with thin magnetic film with uniaxial anisotropy is that application of a magnetic field perpendicular to the easy axis of magnetization and tangential to the plane of the film (transverse field) produces a substantial reduction in the coercive force required for switching the thin film strip. This principle is employed in the present invention in various novel arrangements of an extremely fast multidimensional memory system wherein a transverse field is employed for control purposes. In one embodiment an addressing scheme for read and write operations may utilize several drive lines for coincident selection purposes, while the transverse field may control coincident selection by controlling the threshold switching value of the magnetic film element. This arrangement is equally applicable to two-dimensional arrays or three-dimensional memory systems. In another arrangement, the transverse field is utilized to provide an inhibit function. In still another embodiment, coincidence of two transverse fields and one longitudinal field are required for selection purposes, the longitudinal field being used for control purposes. A high degree of flexibility is afforded by the manner in which the transverse field may be used to control a magnetic film element or system in various novel arrangements for memory, and such will become more apparent as the ensuing description further unfolds the novel aspects of the present invention.

Accordingly, a primary object of the present invention is to provide an improved high speed memory system.

Another object of the present invention is to provide an extremely fast multicoordinate memory system utilizing magnetic elements which exhibits uniaxial anisotrophy.

Still another object of the present invention is to provide a memory element of thin magnetic film having a preferred axis of magnetization, the direction of magnetization indicating the information representing the state of the element wherein application of a magnetic field having a component opposite to the direction of magnetization of said element results in rotational switching of said element from one information representing state to the other.

A further object of the present invention is to provide a rapid, multicoordinate memory system employing storage elements of thin magnetic film wherein the application of a transverse magnetic field to the thin film element reduces the coercive switching threshold of the element.

Another object of the present invention is to provide an improved information storage element of uniaxial anisotropy having two directions of preferred magnetization wherein magnetization in one and the other direction is representative of two binary states so characterized that the switching threshold of the element along its preferred axis of magnetization is substantially reduced in the presence of a magnetic field having a transverse component.

Still a further object of the present invention is to provide a multicoordinate magnetic memory array comprising a plurality of two coordinate planes of thin magnetic film elements wherein the coercive threshold of selected planes may be so modified that coincident energization of the coordinates representing a particular address in all planes results in switching the elements in selected planes from one direction of easy magnetization to the other.

Still another object of the present invention is to provide a two coordinate memory array of magnetic film elements of uniaxial anisotropy in the form of recesses of generally rectangular form, each recess representing a coordinate address, the conductors over each recess being adapted to generate a magnetic field along the preferred axis of magnetization when energized.

Other objects of the invention will be pointed out in the following description and claims and illustrated in the accompanying drawings, which disclose, by way of example, the principle of the invention and the best mode, which has been contemplated, of applying that principle.

Figure 1:
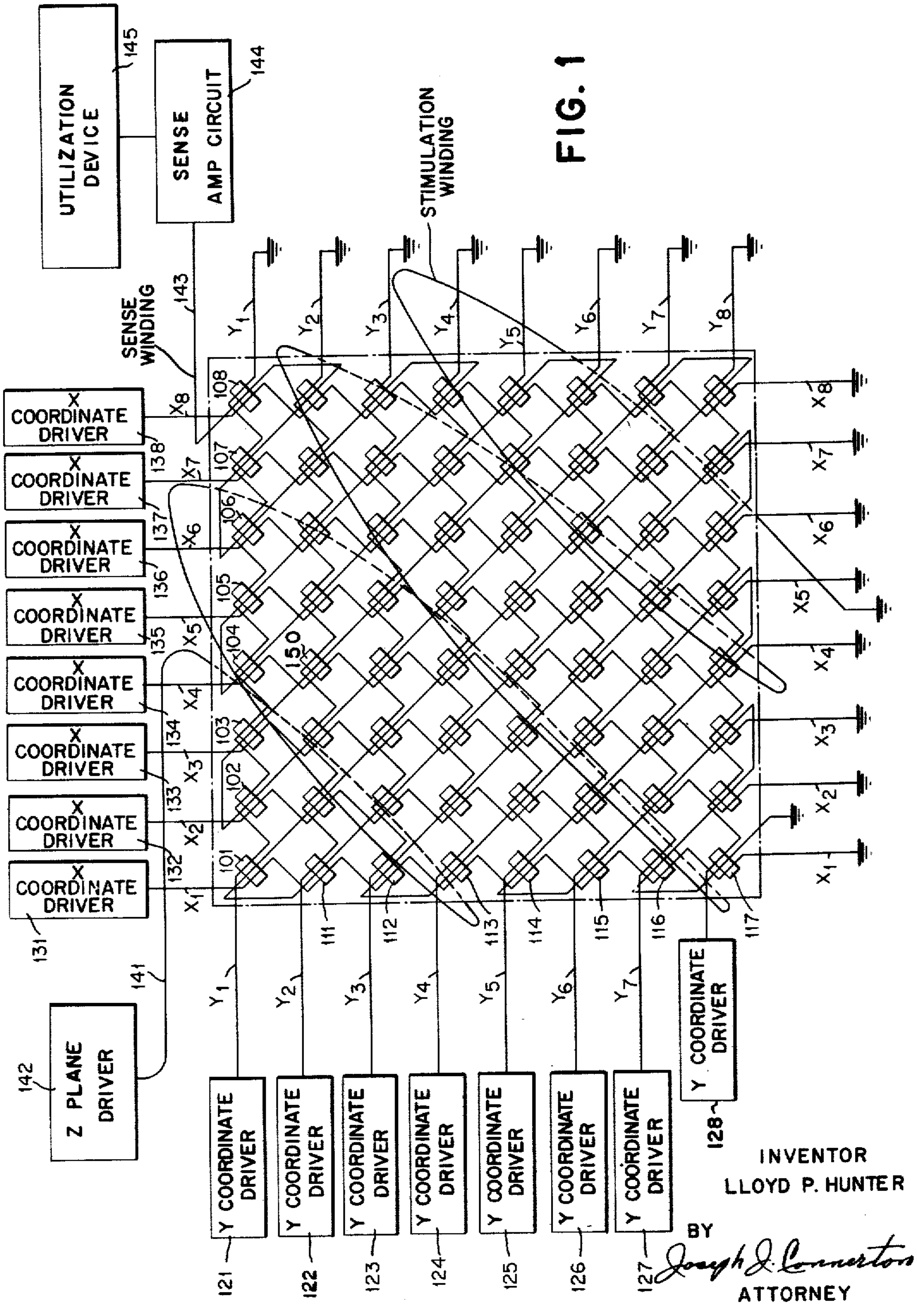
FIG. 1 illustrates in schematic form one plane of a three dimensional memory system utilizing thin strips of magnetic film.

The use of magnetic cores of both metallic and ferrite materials in storage and selection systems for digital information is well known in the art. The storage elements in these systems are composed of magnetic material having a high retentivity and preferably having magnetic hysteresis characteristics substantially rectangular in shape. Since these characteristics are common to magnetic storage elements including the magnetic film employed in the present invention, the composition and mode of operation of such devices will be briefly described.

Considering first the composition of the material forming the conventional storage elements such as magnetic cores, such material is generally polycrystalline in structure, each crystallite having three directions of easy magnetization along the three axes of the crystallite. The individual crystals are usually randomly oriented throughout the material. At zero magnetization, the magnetic domains comprising the storage element may be considered as randomly aligned, while at remanence magnetization, the magnetic domains are aligned in a direction corresponding to the nearest axis of easy magnetization in each crystallite.

Conventional magnetic memory systems using elements of the above described type generally operate as coincident devices which are not responsive to signals of a predetermined magnitude but which are responsive to the simultaneous application of two or more such signals. Considering first a two-dimension magnetic core plane as illustrative of the operation of such devices, each magnetic storage element in a two coordinate array would have at least three windings or conductors associated therewith, an X and Y coordinate winding and an output or sense winding. Once initially magnetized by an external field, such a magnetic element, even though the magnetic field is removed, will remain in that remanent state until the external field is reversed. When employed as a digital storage device, one magnetic remanent state designates a binary one while the opposite magnetic remanent state designates a binary zero, or vice versa. Depending on the logical operation being performed, the signal applied to either coordinate winding is generally designated as a half-read or half-write signal, either current alone being ineffectual to reverse the magnetic state of the core. However, if two such signals are simultaneously applied to the coordinate windings of a particular element producing a field in a direction opposite to the state of the element, the resultant field is sufficient to reverse the state of the element and a signal indicative of this reversal will be induced in the sense winding. The polarity of the output signal will designate the binary state to which the magnetic core is switched.

The present invention is directed to a high speed storage device comprising thin magnetic film elements attached to a suitable substrate. The magnetic material comprising the thin film is a polycrystalline material of insufficient thickness to support domain walls which is fabricated on the substrate under the influence of an external magnetic field resulting in a single bi-directional axis of easy magnetization as contrasted with the three randomly oriented directions of easy magnetization in the polycrystalline structure of typical magnetic core material.

As heretofore noted, one characteristic of a thin magnetic film with uniaxial anisotropy in the longitudinal direction is that the application of a transverse magnetic field to the film reduces the coercive force required for switching in the longitudinal direction. As more fully described hereinafter, a transverse magnetic field applied to a thin film strip effectively decreases the width of the hysteresis loop of the thin film magnetic material. This characteristic is utilized in the present invention in a coincident type of matrix memory application. As will be more fully described hereinafter, coincident currents of a particular polarity, when applied to the strips of magnetic material, are insufficient in magnitude to reach the threshold or switching value of the film in the absence of a transverse magnetic field. However, if a transverse magnetic field of the nature heretofore defined is applied to the magnetic film, the hysteresis characteristics of the magnetic film are so modified that the threshold for rotational switching is reduced to a sufficient degree that the resultant coercive force of the X and Y coordinate currents exceeds the threshold value of the magnetic material and the film is switched to its opposite magnetic state. A current indicative of this reversal of state will be induced in a sense winding or conductor associated with the particular strip or strips being reversed.

The above use of thin magnetic films requiring a transverse magnetic field as well as two longitudinal magnetic fields to produce a reversal of state of the thin film elements is fundamentally different from the approach of a three coordinate coincident current device employing magnetic cores wherein two of the three coordinate currents must be simultaneously applied in the absence of the third or inhibit current to reverse the magnetic states of the cores. The present invention contemplates the use of these magnetic elements as part of a multicoordinate matrix, each plane of which has a separate transverse winding, the individual elements of which may be selected by pulsing the associated coordinate conductors during the interval when a transverse magnetic field is applied to the matrix. This operation will be described in greater detail hereinafter with reference to the attached drawings.

Referring now to the drawings and more particularly to FIG. 1 thereof, there is illustrated in schematic form a single plane or two coordinate array of a multicoordinate memory system. To facilitate the ensuing description, an 8 x 8 matrix of thin magnetic film strips is illustrated, though the principles of the subject invention are equally applicable to larger or smaller size matrices. For ease of description, the thin magnetic film elements are shown in rectangular form, the longer sides of the rectangle hereinafter referred to as the longitudinal direction. The magnetic storage elements in the illustrated embodiment are thin magnetic film strips of a nickel-iron alloy which are deposited on a suitable substrate under the influence of an external magnetic field along the longitudinal axis of the magnetic elements. As heretofore noted, in a typical nickel-iron alloy film fabricated in the presence of a magnetic field, the magnetization has two stable states which have an angular displacement of 180°. However, it should be noted that switching depends upon film geometry as well as thickness and that for any given field square and round film elements switch more rapidly than rectangular. In a particular embodiment, the thin film comprises an alloy of 82% iron and 18% nickel which is deposited on a glass substrate. The individual film strips are preferably semi-circular shaped grooves in the substrate to ensure a more uniform magnetic field generated therein. In an alternative arrangement the individual film strips may be deposited on the flat surface of the substrate. In the preferred embodiment, the film strips are arranged in rows and columns, each row having an associated Y coordinate driver shown as blocks 121 through 128 and each column having an associated X coordinate driver shown as blocks 131 through 138. The top row is shown as strips 101–108, while the column associated with driver 131 is shown as strips 101 and 111–117. While the film strips are shown at approximately a 45° angle with respect to the horizontal or vertical axis of the substrate and with a relatively wide spacing between strips for ease of illustration, such an arrangement is purely optional, the only requirement being that a separation sufficient to prevent interaction between fields be maintained. The only limiting factor with respect to the elements is the minimum size of the strips and the spacing between elements. With respect to the first limitation, the film strips could be approximately 2 x 3 millimeters, while the distance between elements should not be less than one and one-half times the dimensions of the individual film strips. For a given thickness or cross-sectional area of the film, the output signal is strictly a function of the width of the film strips.

To provide a longitudinal field, the X drive lines, labeled $X_1$ through $X_8$, and the Y drive lines, labeled $Y_1$ through $Y_8$, cross the film strip at right angles to the longitudinal axis of the strips, since the direction of the magnetic field produced by a current is at right angles to its direction of flow. However, the X and Y drive lines are electrically insulated from the strips of film as well as from each other. A transverse winding 141 common to all film strips is provided about the entire plane, and may comprise a solenoid whose axis is substantially perpendicular to the longitudinal axis of the individual strips. Thus when energized by a signal from the Z plane driver, shown as block 142, a field transverse to the longitudinal axis of the film strip is generated. A common sense winding 143 is connected adjacent to, but electrically insulated from each film strip to detect the reversal of state of any of the elements therein. A sense amplifier 144 is provided at the output of the sense winding to raise the output signal to a desired level before its is applied to a utilization device shown as block 145. Such a utilization device might comprise, for example, a storage register for a digital computer.

Before proceeding further with an explanation of the operation of the device in FIG. 1, it is appropriate first to consider in greater detail some known behavior patterns and characteristics of thin magnetic film with uniaxial anisotropy, particularly the manner in which a transverse field reduces the swiching threshold for the film.

Figure 2:
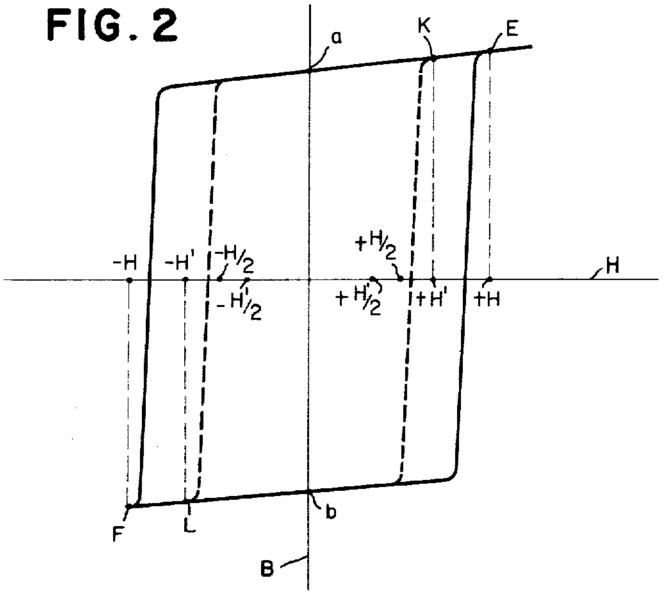
FIG. 2 is a curve illustrating the effects of a transverse magnetic field on the hysteresis characteristics of thin magnetic film.

Referring now to FIG. 2, there is shown a curve indicating the hysteresis characteristics of the thin magnetic film material employed in the present invention. In memory systems utilizing magnetic cores, the cores are selectively driven to one or the other of their stable residual states by energizing core windings and thereby applying a magnetomotive force of desired magnitude and direction. Since this hysteresis characteristic is also common to thin magnetic film, a more detailed description of magnetic core operation will be provided.

One of the stable remanence states designated as point *a* is arbitrarily chosen to represent a binary one and the other stable state designated as point *b* then represents a binary zero. Assuming the core is employed in a conventional two dimensional array, for example, associated X and Y drive lines may be energized with currents which individually create fields having a magnetizing force $H/2$ less than the critical field, but the combined magnetizing force of these fields H at a selected coordinate intersection may be such as to exceed the threshold or critical field and the element is switched provided the fields are in an aiding relationship. Points E and F, when projected onto the H abscissa of the curves, indicate the relative magnetizing force required to magnetize a core in the binary one and zero state, respectively. These points are noted on the curve as +H and −H respectively. The magnetizing force produced by the half-select currents is indicated along the abscissa by $+H/2$ and $-H/2$ respectively.

Considering for example, a magnetic element having a remanent state indicated by point *b*, application of a coercive force of $H/2$ magnitude resulting from a half-select current and less than the coercive force necessary for switching is ineffective to switch the element from state *b* to state *a*; however, a force of +H magnitude causes the magnetic element to traverse the major hysteresis loop from point *b* to point E. Upon relaxation of this force, the magnitude element returns to the stable remanence state indicated by point *a*. Similarly, if the magnetic element was in the binary one state, application of a coercive force of −H magnitude will cause the magnetic element to traverse the major hysteresis loop from point *a* to point F, and upon removal of this coercive force, the element will return to the binary zero remanence state. The above described reversals of state of magnetic elements under external control, are generally referred to as switching. Thus, if a particular magnetic element in an array is simultaneously energized by the associated coordinate conductors or windings, the resulting field will exceed the threshold field provided it is applied in a direction opposite to the existing magnetic state of the element and cause the element to switch to its opposite magnetic state. Moreover, the threshold field may be secured by energizing three or more conductors or windings instead of two if desired.

With respect to thin magnetic film with uniaxial anisotropy, however, application of a transverse or quadrature field tangential to a thin film element or strip effectively decreases the width of the hysteresis loop of the material, thereby reducing the threshold field required for switching in a longitudinal direction. The threshold for rotational switching is thus lowered by the presence of a magnetic field tangential to the plane of the film but perpendicular to the field used for switching, i.e., perpendicular to the easy direction of magnetization of the film. The hysteresis loop of a magnetic element in the presence of a transverse field is indicated in dotted form in FIG. 2. It is thus evident that the width of the hysteresis loop of thin film is at a maximum in the absence of a transverse field, and is reduced by an amount dependent upon the intensity of the transverse field. The magnetizing force required to switch a thin film element in the presence of a transverse field may be considerably less than that of a magnetic core, for example, having identical hysteresis characteristics. The switching thresholds for thin film are indicated by points K and L, which projected onto the abscissa are indicated by points $+H'$ and $-H'$ respectively. The associated half-coincidence magnetizing forces are indicated by points $+H'/2$ and $-H'/2$.

From the above description it is apparent that coincidence of two half-select currents producing a total magnetizing force of $+H'$ or $-H'$ will exceed the threshold switching field of the thin film during the time when a transverse field exists, but will be below the switching threshold field of the film in the absence of a transverse field. It should be noted that the transverse field component of the earth's magnetic field may be sufficient to reduce the longitudinal switching threshold to such a value that coincidence of the longitudinal fields may cause switching of the film element even in the absence of a deliberately applied transverse field. To eliminate the influence of the earth's magnetic field, the two coordinate plane or three coordinate system should be mounted within a magnetic shield.

A high degree of flexibility is afforded by the manner in which switching may be controlled by a transverse field in various novel arrangements of an extremely fast multidimensional memory system, and such will become more apparent as the ensuing description further unfolds the novel aspects of the present invention.

Before describing the operation of the memory system illustrated in FIG. 1, the behavior of thin film will be described with reference to the curves of FIG. 3. It should be noted that the curves of FIG. 3 do not necessarily represent the actual variation of switching time for various film characteristics, but merely represent in a general way the qualitative variations of switching time vs. longitudinal field strength under the influence of transverse fields of different magnitudes.

The ideal situation for rotational switching occurs if the threshold for rotational switching is lowered below the corresponding threshold for domain wall switching in a thin film. However, switching may be initiated by domain wall motion and continues until the rotational switching threshold is reached.

Figure 3:
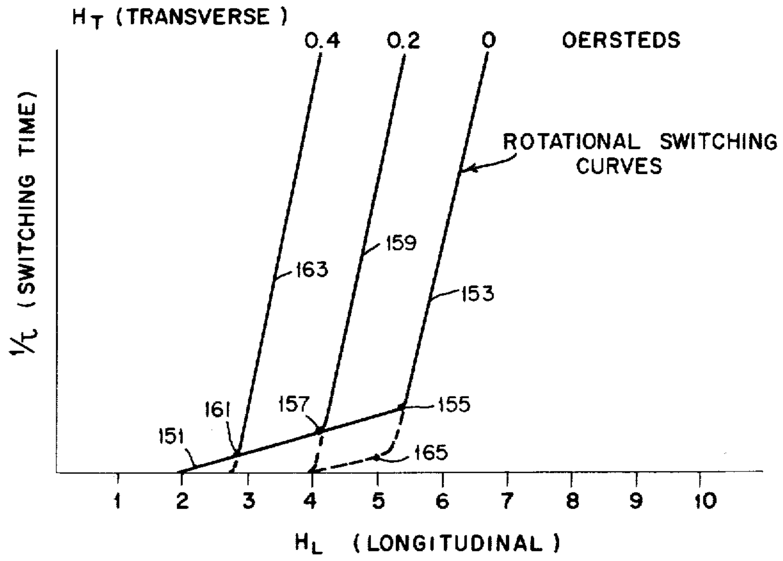
FIG. 3 is a family of switching characteristics illustrating the variation in switching time vs. coercive force for selected samples of thin magnetic film.

Referring now to FIG. 3, there is illustrated the switching curves of switching time vs. longitudinal field strength (magnetizing force along the easy direction of magnetization) for two samples of thin magnetic film under transverse field magnitudes of 0, 0.2 and 0.4 oersted. It should be initally pointed out that the two samples illustrated have the switching characteristics of thin film, i.e., have threshold values of longitudinal field which when exceeded result in rotational switching despite the absence of a transverse field. The samples of thin film selected were those whose composition was optimum, i.e., having substantially zero magnetostrictive effect since it has been determined that the properties of films having positive or negative magnetostrictive effects resulting from excess of iron or nickel in the composition vary widely.

Referring now to the first film specimen illustrated by curve 151, which may be a specimen of the size heretofore described and 4,000 angstroms thick, it is seen that in the absence of a transverse field, a longitudinal field in excess of 5 oersteds is required to produce rotational switching as indicated by curve 153. The initial straight line portion of the curve between points 151 and 155 illustrates the domain wall motion portion of switching of the specimen. At point 155, the rotational switching threshold is reached, and a relatively abrupt transition to rotational switching occurs. Applying a transverse field of 0.2 oersted, the rotational switching threshold is lowered to approximately 4 oersteds, indicated at point 157, after which rotational switching occurs as indicated by curve 159. Increasing the transverse field strength to 0.4 oersted, the rotational switching threshold, indicated by point 161, is lowered below 3 oersteds, above which rotational switching occurs as indicated by curve 163.

Referring now to the dotted curves of the second sample, which may be, for example, 1,000 angstroms thick, it is seen that in the absence of a transverse field, switching is initiated by domain wall motion and the rotational switching transition occurs at approximately 5 oersteds of longitudinal field strength, indicated by point 165, after which rotational switching indicated by curve 153 occurs. For a transverse field of 0.2 oersted, the rotational switching threshold, indicated by point 157, occurs at 4 oersteds, which is approximately the domain wall switching threshold. Increasing the magnitude of the transverse field to 0.4 oersted, rotational switching occurs at a point below 3 oersteds, indicated by point 161, considerably before the threshold for domain wall switching and then follows the rotational switching curve 163. Curves 153, 159 and 163 actually represent two superimposed switching curves for the two samples.

Analyzing the above curves, it is seen that for certain samples of film, switching may be initiated by domain wall motion before the rotational switching threshold is reached. Under theoretical optimum conditions of specified thicknesses of thin film geometry, rotational switching is initiated substantially before the threshold of reverse domain nucleation is reached and the film is therefore capable of being switched solely by rotation of the magnetization vectors without the interference of the motion of domain walls. From the curves of FIG. 3, it is apparent that such rotational switching is very much more rapid than domain wall switching and is therefore of importance to high speed memory applications. The speed of rotational switching may vary between nominal limits of .01 to 0.5 microsecond. It is further noted that as the magnitude of the transverse field is increased, the rotational switching threshold decreases. For very thin films (1,000–2,000 angstroms, for example), the threshold or coercive field for rotational switching is not appreciably changed as the thickness of the film is decreased. For thicker films 4,000 angstroms or above, the threshold field for rotational switching is appreciably decreased as the thickness of the film is decreased.

Referring back to FIG. 1, the manner in which the above described principle is employed for writing into and reading from a high speed memory system will be described. In the ensuing description, write and read signals from the X and Y coordinate drivers are designated by positive and negative pulses, respectively. Each storage element or thin film strip represents a particular address identified by the associated X and Y coordinates.

In the particular arrangement illustrated in FIG. 1, the addressing scheme for read and write operations may utilize several drive lines for selection purposes and a transverse field for control purposes. In the two dimensional array illustrated, X and Y drive lines are arranged with a thin film strip at each coordinate intersection. Selected X and Y drive lines may be energized with currents which individually create fields less than the critical or threshold switching field of the strip, either with or without a transverse field, but the combination at a selected coordinate intersection is such as to exceed the threshold field provided the fields are in an aiding relationship and a field transverse to the longitudinal axis of the magnetic strips is applied to the array.

In order for the device to function as a coincident current memory system, the energization of the transverse winding must occur during certain portions of a recording cycle. In a high speed digital computer, the memory is preferably a random access memory wherein the pulses are directed to a specific address for each operating cycle. Alternatively, for certain applications, it may be desirable to operate on the memory system in a sequential manner.

Normally the operating cycle of a memory device comprises a read interval followed by a write interval. This cycle is assumed in the arrangement herein described wherein a read signal is a negative pulse while a write signal is a positive pulse. However, it is to be understood that other operating modes may be employed within the scope of the present invention. Reading restores all elements at the selected address to the zero state. Writing by energizing the selected coordinates in a proper direction (opposite to read) does not enter a one unless the stimulation or transverse winding is energized. This may be done on selected planes where a multi-bit word is represented with one bit of the word represented by a magnetic element in each plane at the same common address. It is not necessary to write a zero in the device since the particular address has been returned to the zero state during the read interval of an operating cycle. On the other hand, reading must be accomplished with the stimulation winding activated as the X and Y coordinate pulses alone are less than the coercive force threshold for an element not subjected to a transverse field.

Summarizing the above operation, during the read interval or first portion of an operating cycle, the transverse field is always energized. During the write interval of an operating cycle, however, the transverse field is selectively energized only when it is desired to record a one. The polarity of the signal employed to energize the transverse winding is immaterial, since a signal of either polarity effectively decreases the width of the hysteresis loop on each side. To prevent unduly complicating the present description, the manner in which the transverse signal is synchronized with the read and write signals as above described is not shown, since it is considered that such means are well established in the art and a description thereof is not considered essential to an understanding of the present invention. During the read interval of an operating cycle, the presence of a one in the address being interrogated will cause a signal to be induced in the sense winding. During the write interval of a cycle, if a one is written in the selected address of a particular plane, a signal of opposite polarity will be induced in the sense winding. In other words, each time the direction of the magnetic field in a film strip is reversed, a signal is induced in the sense winding. However, due to the bi-polar response characteristic of the sense amplifier the polarity of the induced signal is not material.

Assuming that it is desired to read and then write a one in the memory location identified by X and Y addresses of 00010000 and 01000000 wherein the digits correspond to $X_1$ through $X_8$ and $Y_1$ through $Y_8$ respectively, a negative signal will be applied from X and Y coordinate drivers 134 and 122 to the conductors labeled $X_4$ and $Y_2$ respectively. Simultaneously, the transverse field will be energized by a signal from Z plane driver 142. If a zero is stored in the memory location 150 positioned at the coordinate intersection of the X and Y conductors, the strip remains magnetized in the same direction and no output is detected by sense winding 143. However, if a one is stored in film strip 150, the magnetic field provided by the coincident currents applied to film strip 150 exceeds the threshold field of the element due to the effect of the transverse field, and rotational switching occurs. A signal indicative of this switching is then induced in the sense winding 143 and after being amplified by sense amplifier 144 is applied to utilization device 145. This operation occurs simultaneously for all planes in a three coordinate memory system in which the transverse field is energized, each plane having an associated sense winding.

Sense amplifier 144 is any suitable circuit for detecting the presence of binary information signals of positive or negative polarity or both, but in any event the output should be indicative of the information signals sensed. For example, positive or negative information signals detected may indicate binary one depending on the position of the storage element with respect to the bi-directional sense winding used. In the preferred embodiment, signals detected by the sense winding from an element that retained a "one" state will be of opposite polarity during the read and write intervals. In an alternative arrangement wherein a unipolar sense winding is used, the sense amplifier could be employed to detect only signals of a given polarity and such signals may be arbitrarily designated as representing either binary one or binary zero. For example, positive signals only could be detected and would designate a binary one, while the absence of a positive signal would designate a binary zero.

After the read interval, the magnetic element at the selected address is in the zero state. To write a one in the selected address, positive signals are applied from coordinate drivers 134 and 122 in time coincidence with a transverse signal applied from Z plane driver 142. The transverse field reduces the width of the hysteresis loop in the manner heretofore described, so that the resultant coercive force exceeds the threshold value in a positive direction and rotational switching occurs. A signal opposite in polarity to that occurring during the clearing or reading operation is induced in the sense winding 143 and applied to the utilization device 145. As noted heretofore, to write a zero in magnetic element 150, no switching is necessary since the read interval effectively performs the additional function of writing a zero.

Thus if it is desired only to read without destroying the information contained in memory, the write portion of an operating cycle can be used to regenerate the information in a conventional manner. If it is desired only to record or write information in memory, the read portion of the operating cycle can be used to clear the selected memory locations prior to writing.

From the foregoing discussion of a two dimensional array, it will be appreciated that numerous arrays of this type may be stacked, forming a three dimensional memory system. In such event the Z lines may be used to select which of the associated planes are to be read, for example, and may also be used to inhibit or permit the writing of binary information during a write operation in the manner heretofore described with reference to the two dimensional array.

In the above described arrangement, the X and Y coordinate drivers may be of the type described in copending application Serial Number 590,701, filed by Erich Bloch on June 11, 1956, now Patent No. 2,947,977, issued August 2, 1960. The Z plane driver may be any pulse generating circuit which generates a pulse of sufficient amplitude to provide a transverse field of a relative intensity of 0.1 to 0.4 oersted, and is in turn dependent upon the physical characteristics and circuit parameters of the stimulation winding. Sense amplifier circuit 144 may be of the type described in copending application Serial Number 443,284, filed by E. W. Bauer et al, on July 14, 1954, now Patent No. 2,889,540, issued June 2, 1959.

With reference to the fabrication of a thin film memory system, a glass backing strip or substrate having semi-circular grooves therein may have thin film evaporated over the entire surface thereof. By subjecting the surface to a grinding operation, the film remaining will be that deposited within the semi-circular grooves. Alternatively, if it is desired to evaporate the film on the flat surface of a backing strip, a mask having openings corresponding in size and location to the thin film elements is laid over the substrate material. As noted heretofore, the substrate may be glass, the non-critical thickness of which may vary in accordance with the structural strength desired. In either instance, evaporation may take place in a bell jar so that the thin film may be deposited in the desired areas by evaporation in a vacuum. As heretofore noted, the preferred composition of the thin film alloy is 83% iron, 17% nickel. To obtain a mixture of these proportions, the evaporation rate of the component elements may be individually controlled and related in accordance with their composition ratio, i.e., 83 to 17. By means of this arrangement, considerable flexibility is provided since the relative proportions of both elements may be individually varied as desired to provide an iron or nickel rich mixture. By so controlling the distillation rate of the thin film constituents, the film composition of successive two dimensional arrays may be maintained uniform.

With respect to fabrication of thin film in a magnetic field, the film may be deposited or annealed under the influence of an external magnetic field whereby the vectors comprising the thin film are aligned in a direction designated as the easy or preferred axis of magnetization. Obviously, the film could be deposited and annealed under the influence of the external field, but either process alone should provide the desired anisotropy. To generate a magnetic field for such a purpose, either a permanent or an electromagnet could be employed. The coordinate wiring arrangement could comprise insulated wire connected in the manner shown, or printed or etched wiring of a type described hereinafter.

Figure 4:
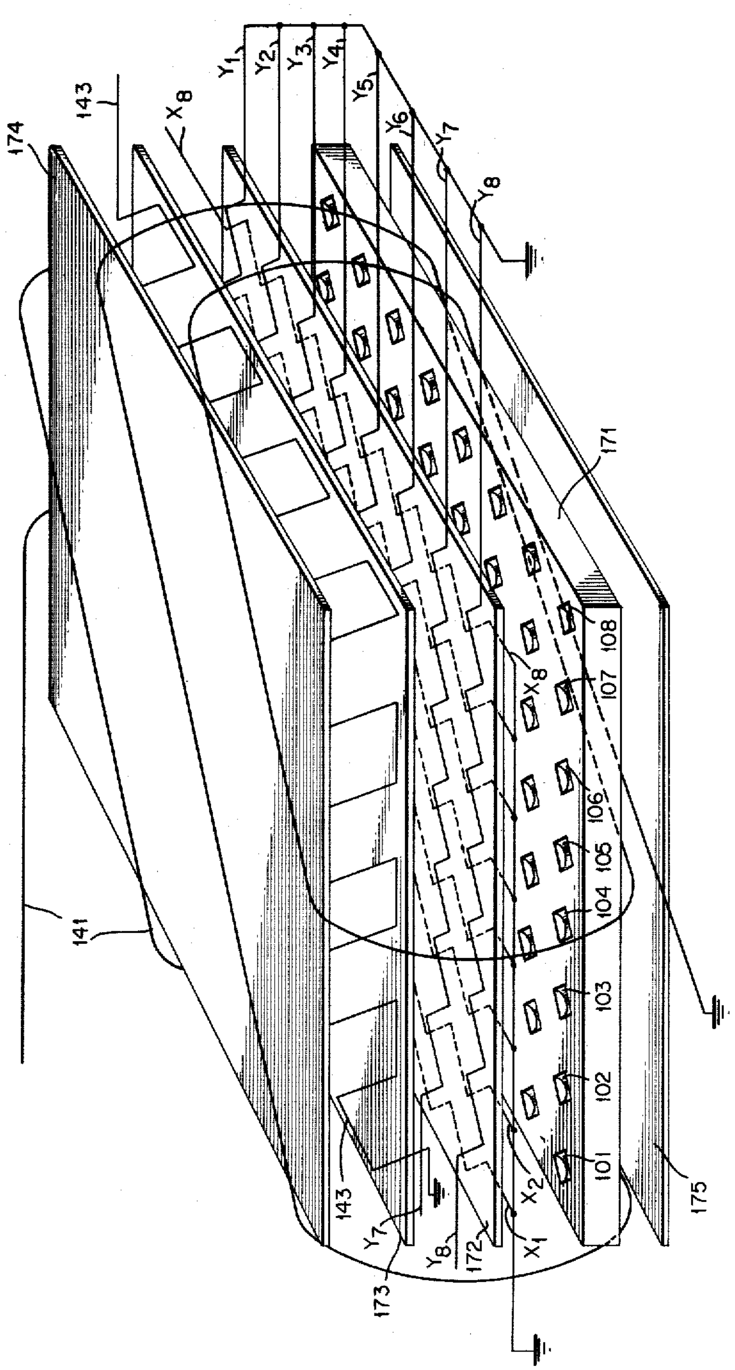
FIG. 4 is a plan view of the embodiment illustrated in FIG. 1.

Referring next to FIG. 4 there is illustrated an exploded plan view of one embodiment of the invention illustrated schematically in FIG. 1. According to one suitable arrangement, the backing material 171 is a substrate having sufficient strength to provide adequate structural support for the thin film memory elements located thereon. Although the memory system illustrated in FIG. 1 may be fabricated by various methods, it is especially adaptable to multi-layers printed circuit techniques wherein the wiring and insulation materials are preferably very thin layers. A printed card 172 having the X and Y coordinate wiring printed on opposite sides thereof is mounted directly over the substrate so that the coordinate conductors over the thin film elements are perpendicular to the longitudinal axis of the thin film elements. The Y coordinate conductors such as Y7 and Y8 are shown as solid lines on the printed card 172, while the X conductors such as X1 and X2 are shown in dotted form, indicating that the Y and X coordinate conductors are on the top and bottom respectively of printed card 172. However, it should be noted that the X and Y coordinate may be mounted on either side of a single card or mounted on separate cards suitably insulated from one another. The next layer in the multi-layer arrangement of FIG. 4 is a printed card having a sense winding 143 printed on the top surface thereof and suitably insulated from the X and Y coordinate conductors. The X and Y coordinate conductors and sense winding when bonded to the substrate 171 will provide a wiring arrangement of the type illustrated in FIG. 1. The succeeding layer 174 is insulation and a stimulation winding 141 is wound over the assembly in the form of a solenoid. As heretofore noted, the solenoid winding should be so arranged that its axis is substantially perpendicular to the longitudinal axis of the film elements to provide a transverse field. It should be noted that the field need not be exactly transverse, since it is the transverse component which reduces the coercive switching threshold. It should be substantially transverse, however, since the longitudinal component of the stimulation field will add to or subtract from the longitudinal field of the thin film and if large enough result in erratic operation of the memory. A layer of insulation 175 is then mounted below the substrate so that numerous arrays of this type may be stacked or bonded together to form a three dimensional memory system. A layer of insulation not shown in FIG. 4 could be applied above card 174 in the top array of such a memory element. Considering the various layers illustrated in FIG. 4, the two dimension array may be suitably packaged or clamped, for example, by bonding together under appropriate conditions of heat and pressure. As previously mentioned, the embodiment of FIG. 4 is an exploded view of the various parts which in practice are thin layers arranged in abutting relationship forming a compact and thin unit. Because of its required strength, the substrate 171 is perhaps the thickest element in the package, with its thickness in practice dependent upon the strength of the substrate used.

In a three dimensional array, employing the simplest arrangement, it will be apparent that the direction of current through the X and Y coordinate conductors will be opposite in alternate planes. This presents no problem however, since the alternate planes may employ opposite remanence states as indicative of binary ones and zeros, or the sense pattern may be reversed to compensate for the reversal of coordinate conductors. In this manner signals in alternate planes will be of the same polarity. However, since the reversal of state of a particular film strip is indicative of the state of the element and since the sense amplifier is a device which provides a unidirectional output from a bi-directional input, the state of the element representative of a particular binary number is not controlling since any reversal of state will be detected by the sense amplifier. It may be further noted that the sense winding is threaded through each two coordinate array in a zig-zag pattern so that its direction with respect to film strips is opposite to that of adjacent strips in the same row or column.

While the above described arrangement has illustrated a preferred embodiment of the present invention, the critical features of any geometrical arrangement employed consist primarily in locating the drive current conductors relative to the magnetic film so that the magnetic film becomes substantially a surface of uniform field strength for each driving line. Deviations from this ideal arrangement will produce effective hysteresis loops which lack squareness to some degree. In a practical embodiment, by arranging the X and Y conductors on opposite sides of center, the hysteresis loops of the fields generated by the conductors will be very similar. The conductors should be spaced as close to the center of the film strips as possible, since the squareness of the hysteresis loop will vary inversely as the off-center distance of the conductors. The X and Y coordinate conductors are electrically insulated both from the thin film strips and from each other. The stimulation winding is also electrically insulated from the conductors in the arrangement and so wound that the field generated thereby is transverse to the longitudinal axis of the individual film strips.

It is believed that methods of preparing the individual printed circuit cards such as shown in the arrangement of FIG. 4 are sufficiently well known that a more detailed description is not required to illustrate the subject invention.

Figure 5:
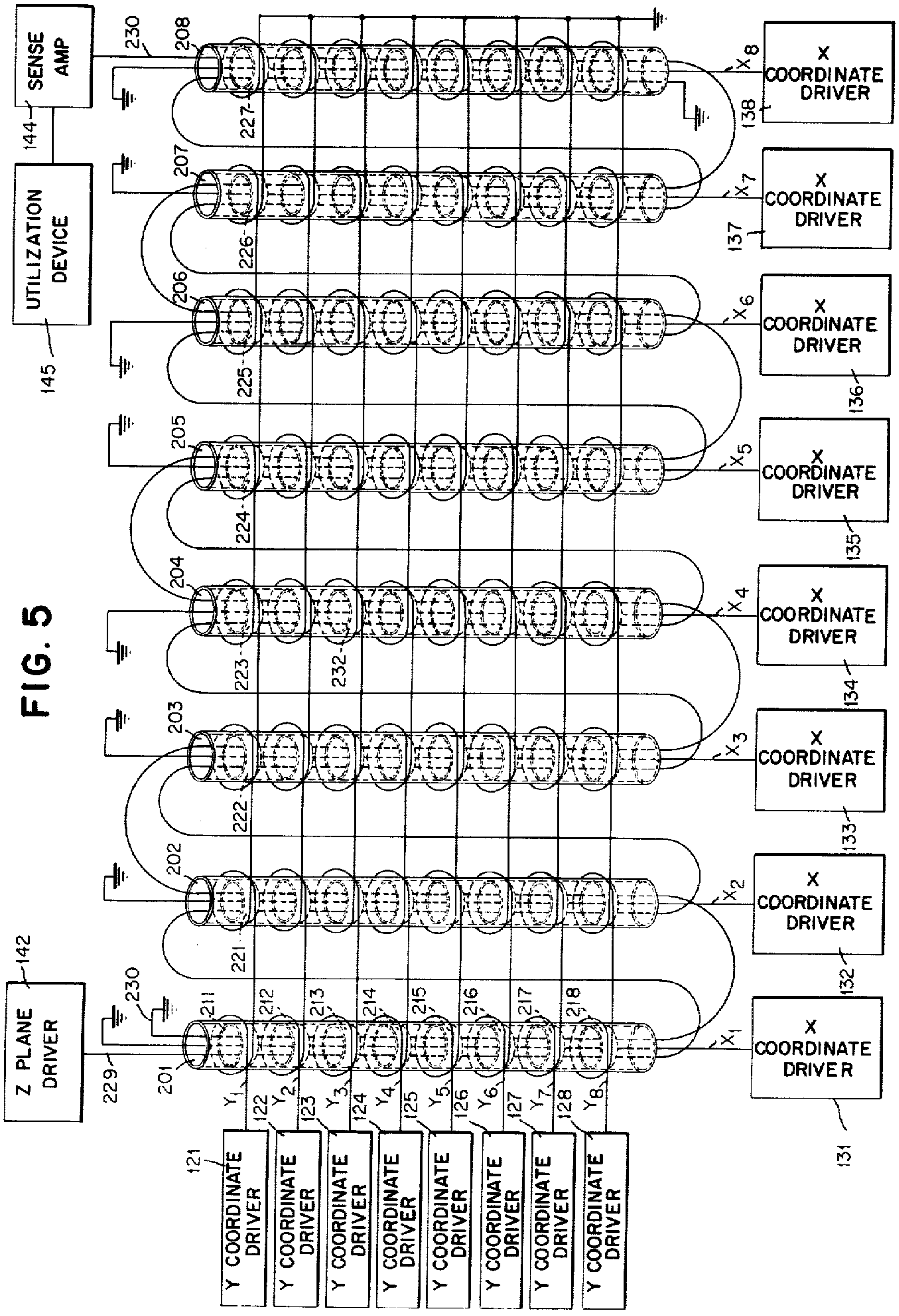
FIG. 5 illustrates a second embodiment of a rotational memory system utilizing thin magnetic film.

While the above described system illustrates a particular embodiment of the subject invention, another embodiment utilizing the novel principles of the present invention is illustrated in FIG. 5. Referring now to FIG. 5, there is illustrated a thin film memory system utilizing tubular substrates having thin film rings deposited on the inner surface thereof. The illustrated embodiment is a matrix having eight tubes 201–208, each tube having a plurality of eight rings, such as rings 211–218 in tube 201 deposited therein to form an 8 x 8 matrix having the same storage capacity as the embodiment of FIG. 1. Each tube has an X conductor associated therethrough, these conductors labeled $X_1$—$X_8$ being connected from X coordinate drivers 131–138 through tubes 201–208 to ground. Each ring has a Y conductor associated therewith, the Y coordinate conductors being wrapped about the outer periphery of the tube and positioned to correspond to the area of the thin film rings. These conductors are connected from Y coordinate drivers 121–128 through conductors $Y_1$–$Y_8$ and wound about the corresponding rings to ground. Conductor $Y_1$, for example, is wound about rings 211 and 221–227. A third conductor 230, threaded through tubes 201–208 in the same direction, functions as an inhibit winding connecting Z plane driver 142 through conductor 229 to ground. A sense winding 230 is threaded through all tubes and connected at its output to sense amplifier circuit 144, the output of which in turn is connected to a utilization device 145.

In the above described embodiment, selection results from the coincidence of two applied magnetic fields in quadrature, wherein one field results from the Y coordinate and the other from the X coordinate. However, selection occurs only in the absence of an inhibit current from Z plane driver 142. Since the inhibit winding is threaded through tubes 201–208 in a direction opposite to the X coordinate conductors a signal of the same polarity as that provided by the X coordinate conductors will subtract from the X coordinate signals. Assume a positive signal is applied from coordinate driver 134 to the selection conductor labeled $X_4$. This current is insufficient in the absence of a Y selection current to cause switching in any of the rings associated with tube 204. If, however, a positive signal is applied from Y coordinate driver 123 to conductor $Y_3$, for example, rotational switching will occur in film ring 232 at the intersection of the X and Y coordinate conductors. However, if a signal from Z plane driver 142 is present on or applied simultaneously to conductor 229, the switching action will be prevented or inhibited because the field strength about ring 232 will be insufficient to produce rotational switching due to the inhibiting action of the Z winding.

To facilitate an understanding of the operation of the embodiment in FIG. 5, reference will be made briefly to the switching curves of FIG. 3. Assume that the current applied to conductor $X_4$ produces about 4 oersteds longitudinal field at the film rings. In the present embodiment, the longitudinal field is around the rings on the inner periphery of the tube, the direction of the field being determined by the polarity of the applied signal under conventional electromagnetic theory. If the current applied to conductor $Y_3$ is sufficient to produce a transverse field of about 0.4 oersted as shown on curve 163 of FIG. 3, on the film rings enveloped by the loops of the $Y_3$ winding, rotational switching will occur at the X and Y coordinate intersection indicated by ring 232. However, if a current of approximately ½ the magnitude of the X coordinate current is applied to conductor 229, the switching action will be inhibited because no film ring will be subjected to more than 2 oersteds of switching field. This arrangement is dissimilar to that of FIG. 1 in that coincidence of the X and Y coordinate currents of proper magnitude will produce rotational switching in the absence of a signal on conductor 229. However, switching is inhibited when desired by applying a signal to conductor 229, thereby effectively decreasing the longitudinal switching field below the threshold value.

Assume the operating cycle of the present embodiment as a memory device is similar to that heretofore described, i.e., a read interval followed by a write interval. The Z plane driver will be de-energized during the read interval, while it will be selectively energized during the write interval. After the read interval, as heretofore noted, all thin film elements will be in a magnetic state corresponding to binary zero. To write a zero, the Z plane driver is energized, thereby inhibiting switching of the associated magnetic film element. To write a one in a particular memory location, a signal will be applied to the associated X and Y coordinate conductors while the Z plane driver will be cut off. The film ring at the coordinate intersection of the X and Y conductors will then switch, and this reversal of state of the thin film element will cause a signal indicative of the reversal of state to be induced in the sense winding.

The above described arrangement would be relatively simple to fabricate by depositing the film rings on the inner surface of the glass tube, while the magnetic field during fabrication can be provided by applying a relatively heavy current to a conductor through the tube. The inner conductors in each tube may comprise conductors insulated from each other and from the film on the tube inner surface wherein any conventional arrangement such as spacers could be employed to maintain separation between the conductors. Alternatively, it appears theoretically possible to coat the entire inner surface of the tubes with a thin film and control switching at coordinate intersections by sharply defining the field produced by a signal on the Y conductor to an area which would not affect adjacent Y coordinate areas. The X and Y coordinate drivers, the Z plane driver, the sense amplifier and utilization device, as identified by subscripts on the drawings, may be substantially identical to the corresponding devices described with reference to FIG. 1.

The above described arrangement wherein selection results from the coincidence of two magnetic fields in quadrature is substantially different from the conventional coincident current system wherein selection results from the magnetic field produced by coincidence of two magneitc fields in a series aiding relationship. The operation of the above described embodiment results from the inhibiting action rather than a gating or stimulation action of the Z winding.

Figure 6:
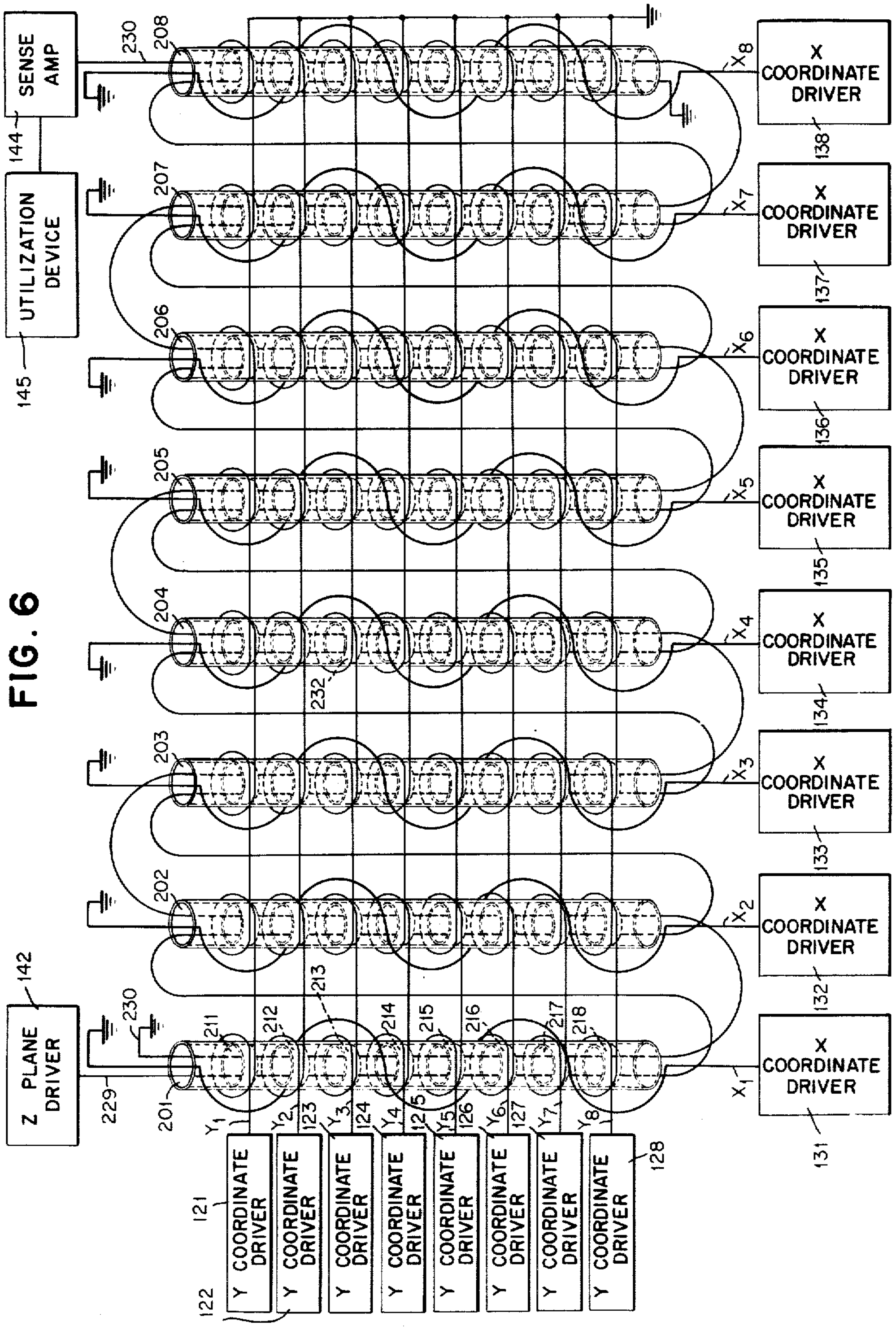
FIG. 6 illustrates a third embodiment of a high speed switching system utilizing thin magnetic film.

In yet another form which the multicoordinate memory may take, consider the construction of FIG. 6 wherein a coincidence of quadrature fields is employed for selection and a longitudinal field is utilized as a stimulation field. This embodiment of the invention is somewhat similar to that of FIG. 5 and like components are identified by corresponding subscripts. In one arrangement of such a device, glass tubes similar to the above described embodiment having thin film rings on the inner surface thereof are employed, the Y coordinate windings being similarly wound about the outside of these rings. Each X coordinate may comprise a helix so wound about the corresponding glass tube rather than a conductor through the tube. By means of this arrangement, the resultant field is in the same direction as that produced by the Y coordinate winding or along the axis of the helix. The Z winding would remain identical to the arrangement in FIG. 5, but would function as a stimulation winding rather than as an inhibit winding. The sense or output winding would consist of a conductor threaded through all the tubes in the same arrangement as the embodiment of FIG. 5. X and Y selection currents, each capable of producing quadrature fields of 0.2 oersted, would produce an effective quadrature or transverse field of 0.4 oersteds for elements at selected coordinates. If the Z stimulation winding is not energized, no switching occurs since the Z winding produces the longitudinal field. However, if a current sufficient to produce 0.4 oersted switching fields is applied by the Z plane driver to the Z winding, then the film ring at the intersection of the selected X and Y coordinates will switch, since the longitudinal switching threshold for a quadrature field of 0.4 oersted, as shown in FIG. 3, is approximately 2.6 oersteds. All other non-selected rings would remain unswitched because they would have only 0.2 oersted quadrature fields and therefore corresponding longitudinal switching thresholds above 0.4 oersted.

Thus effectively the operation of this embodiment is opposite to that of the FIG. 1 embodiment in that the function of the longitudinal and transverse or quadrature fields are reversed. In FIG. 1, the stimulation winding provides a transverse field, while the X and Y coordinates combine to produce a longitudinal field. In the present embodiment, the X and Y coordinates combine to produce a transverse field while the stimulation winding provides the longitudinal field for selection. One advantage of this arrangement is that a relatively small current is required to produce a field of 0.2 oersted.

Rotational switching in the film rings will occur only when the selection fields are opposite to the existing magnetic state of the rings, and each such reversal will cause a corresponding signal to be induced in the sense winding. The X and Y coordinate drivers, the Z plane driver and sense amplifier may be identical to those employed in the embodiment of FIG. 1.

While the above description includes several embodiments of the present invention, other obvious modifications not specifically described may be made. For example, because of the low power requirements of a thin film memory system problems of heat dissipation are reduced and transistors may be employed in the associated circuitry. Such a memory system is adaptable to rapid and automatic manufacture, assembly and packaging. The operational speed in the present state of the art is such that the only limitations at present appears to be the operating speed of associated circuitry.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An information storage device comprising a plurality of tubular elements, each of said elements including a plurality of rings of magnetic material on one surface thereof, each of said rings of magnetic material having a preferred axis of magnetization wherein magnetization in one and the other direction along said axis is representative of two binary states, means inductively coupled to each of said rings for modifying the excitation threshold of said magnetic material by generating a magnetic field having a component transverse to the preferred axis of magnetization and energization means inductively coupled to each of said rings for generating a magnetic field along the preferred axis of magnetization, the magnitude of the field generated along the preferred axis of magnetization exceeding said modified threshold whereby switching of said ring from one to the other direction of said preferred axis of magnetization may be accomplished.

2. An information storage device comprising a plurality of tubular elements, each of said elements including a plurality of rings of magnetic material on one surface thereof, each of said rings of magnetic material having a preferred axis of magnetization wherein magnetization in one and the other direction along said axis is representative of two binary states, first energizing means inductively coupled to each of said rings for generating a field in a predetermined direction along the preferred axis of magnetization, second energizing means inductively coupled to each of said rings for generating a field in the opposite direction along the preferred axis of magnetization and means inductively coupled to each of said rings for generating a field transverse to the preferred axis of magnetization, thereby modifying the switching threshold of said magnetic rings whereby switching from one direction of magnetization to the other along said preferred axis of magnetization may be accomplished by conjoint operation of said first energizing means and said means for generating a transverse field in the absence of said second energizing means.

3. An information storage element comprising a ring of thin magnetic film having a preferred axis of magnetization around the periphery of said ring wherein magnetization in one and the other direction around said periphery is representative of two binary states, first energizing means inductively coupled to said element for generating a magnetic field in one of said preferred directions of magnetization in accordance with a signal applied thereto, the magnitude of said field being less than the normal excitation threshold of said material, second energizing means inductively coupled to said element for generating a magnetic field having a component transverse to said preferred axis of magnetization, said transverse field component functioning to modify said excitation threshold whereby said magnetic field in said preferred direction of magnetization exceeds said modified excitation threshold and third energizing means inductively coupled to said element for selectively inhibiting switching of said element by generating a magnetic field in an opposite direction to the field generated by said first energizing means along said preferred axis of magnetization.

4. An information storage device comprising a plurality of tubular elements, each of said elements having a plurality of rings of thin magnetic material on one surface thereof, each of said rings having an axis of easy magnetization wherein magnetization in one and the other direction around the periphery of each of said rings is representative of two binary states, first coordinate energizing means inductively coupled to each of said elements for generating magnetic fields along said axis of easy magnetization, second coordinate energizing means inductively coupled to each of said rings for generating a magnetic field having a component perpendicular to said axis of easy magnetization and third energizing means inductively coupled to all of said rings for generating a magnetic field in a direction opposite to that generated by said first coordinate energizing means whereby the conjoint operation of said first and second coordinate energizing means in the absence of said third energizing means enables switching of the magnetic rings at the coordinate intersections from one binary state to the other to be accomplished.

5. An information storage element comprising a ring of thin magnetic material having an axis of preferred magnetization around the periphery thereof wherein magnetization in one and the other direction around said periphery is representative of two binary states, first energizing means inductively coupled to said element for generating a magnetic field in one of said directions of preferred magnetization in accordance with a signal applied thereto, the magnitude of said field being less than the normal switching threshold of said material, second and third energizing means inductively coupled to said ring for generating a field substantially transverse to said axis of easy magnetization whereby the conjoint operation of said first, second and third energizing means permits switching said element from one to the other direction of preferred magnetization.

6. An information storage device comprising a plurality of tubular elements, each of said elements having a plurality of rings of thin magnetic material capable of assuming stable remanence conditions on one surface thereof, each of said rings having a preferred axis of magnetization around the periphery thereof wherein magnetization in one and the other direction around said periphery is representative of two binary states, first energizing means inductively coupled to said elements for generating a magnetic field in one direction along said preferred axis of magnetization, the magnitude of said field being less than the normal excitation threshold of said magnetic material, and second and third energizing means inductively coupled to said elements for generating a magnetic field having a component substantially transverse to said preferred axis of magnetization, said transverse magnetic fields functioning to modify said normal excitation threshold of said magnetic material whereby the conjoint operation of said first, second and third energizing means permits switching the magnetic rings at the associated coordinate intersections within said tubular elements from one stable remanence condition to the other.

7. A multicoordinate magnetic memory system comprising a plurality of two coordinate planes, each of said planes containing a plurality of semi-circular recessed thin film elements in substantially rectangular form, each of said film elements having a preferred axis of magnetization wherein magnetization in one and the other direction along said axis is representative of two binary states, a first plurality of coordinate conductors magnetically coupled to but electrically insulated from each of said film elements, a second plurality of coordinate conductors magnetically coupled to but electrically insulated from each of said film elements, each of said film elements having an associated pair of coordinate conductors which traverse said elements at an angle substantially perpendicular to said preferred axis adapted to generate a magnetic field along said preferred axis of said elements when energized, the magnitude of said field being less than the normal excitation threshold of said element, means inductively coupled to each of said planes for modifying the normal excitation threshold of said elements within said plane by generating a magnetic field having a component transverse to said preferred axis of magnetization and sensing means associated with each of said planes for detecting reversal of magnetization of any element within the associated plane whereby energization of a first and a second coordinate conductor in all planes will permit reversal of magnetization only in those planes having said transverse magnetic field.

8. A memory structure comprising, a plane non-magnetizable support plate having a plurality of grooves therein, each groove of said support plate having deposited therein a thin film of magnetic material exhibiting a substantial rectangular hysteresis loop with the surface of the magnetic material in substantial alignment with the plane of the support plate.

9. The structure as set forth in claim 8 wherein said grooves are arranged in columns and rows and the magnetic material therein exhibits an easy axis of magnetization.

10. The structure as set forth in claim 9 wherein each said groove is semi-circular.

11. A magnetic storage device comprising, a member having an apertured annular cross-sectional area made of magnetic material exhibiting a circular easy axis of magnetization with respect to the cross-sectional area thereof, means for passing a first current through the aperture of the cross-sectional area of said member to apply a magnetic field directed along the easy axis thereof being of insufficient magnitude to cause a remanent change in the magnetization of said material, further means for coincidently passing a second current about the periphery of the cross-sectional area of said member to apply a magnetic field directed transverse with respect to the easy axis of said member whereby said magnetic material is switched from one remanent direction of magnetization along the easy axis thereof to another.

12. A magnetic data storage device comprising, a first electrical conductor, a thin film ring of magnetic material exhibiting an easy axis of magnetization defining different stable remanent states of flux orientation surrounding said first conductor, said material further exhibiting a coercive force threshold along said easy axis, a second electrical conductor positioned about the periphery of said material, said first conductor adapted to be energized and apply a field directed along the easy axis of said film having a magnitude less than the coercive force threshold thereof, said second conductor adapted to be energized to apply a field to said film directed transverse with respect to the easy axis thereof and having a magnitude sufficient to lower the coercive force threshold of said film and thereby cause switching of said film from one remanent state to another when coincidently applied with the field provided by energization of said first conductor, and means for coincidently energizing both said first and second conductors.

13. A magnetic data storage device comprising, a first electrical conductor, a thin film ring of magnetic material exhibiting an easy axis of magnetization defining different stable remanent states of flux orientation and a coercive force switching threshold along the easy axis of said film surrounding said first conductor, the easy axis of said material being circumferential with respect to said first conductor, a second electrical conductor positioned about the periphery of said material, said first conductor adapted, when energized, to apply a field along the easy axis of said film having a magnitude insufficient to overcome the coercive force threshold thereof, means for energizing said second conductor to apply a field directed transverse with respect to the easy axis of said film whereby the coercive force threshold thereof is lowered, said means including means for thereafter, in at least partial coincidence, for energizing said first conductor whereby the magnetization of said film is switched from one remanent state to another.

14. A magnetic data storage device comprising, a first and a second conductor, a thin film ring of ferromagnetic material surrounding both said first and second conductors, said ring of magnetic material exhibiting a ring shaped easy axis of magnetization surrounding both said first and second conductors, said easy axis defining opposite stable states of remanent flux orientation for said device, a third conductor wound about the periphery of said magnetic material, and means for coincidently energizing both said first and third conductors to switch the magnetization of said device from one to another stable state to thereby induce an output signal on said second conductor.

15. A magnetic data storage device comprising, a first electrical conductor, a tubular substrate element surrounding said conductor; a peripheral coating in the form of a thin film of ferromagnetic material exhibiting substantial remanence on said element; said magnetic material exhibiting an easy axis of magnetization defining opposite stables of remanent flux orientation and a coercive force switching threshold, a second conductor wound about the periphery of said device over said material; said first conductor adapted to apply a field having at least a component thereof directed along the easy axis of said film but of insufficient magnitude to overcome the coercive force threshold thereof when energized; said second conductor adapted to apply a field having at least a component thereof directed transverse with respect to the easy axis of said film and of a magnitude sufficient to lower the coercive force threshold of said film below the magnitude of the field applied by said first conductor when energized; and means for coincidently energizing said first and second conductors whereby the magnetization of said film is switched from one remanent state to another along the easy axis thereof.

16. A magnetic device comprising, a tubular substrate, a peripheral coating in the form of a thin film of ferromagnetic material exhibiting different stable states of remanent flux orientation along an easy axis of magnetization and a coercive force switching threshold on said substrate; means including an input winding wound about the periphery of said device for applying a magnetic field directed transverse with respect to the easy axis of said film to lower the coercive force threshold thereof to a predetermined magnitude; further means for coincidently applying a field directed along the easy axis of said element having a magnitude less than the coercive force of said threshold film but in excess of the predetermined magnitude of lower coercive force threshold of said film whereby the material of said film is switched from one to another stable remanent state; and an output winding coupling said device for providing an output manifestation of the switching thereof.

17. A magnetic device comprising, a tubular substrate; a peripheral coating in the form of a thin film of ferromagnetic material exhibiting different stable states of remanent flux orientation along an easy axis of magnetization and a coercive force switching threshold on said substrate; means including a first input winding wound about the periphery of said device for applying a magnetic field directed transverse with respect to the easy axis of said film to lower the coercive force threshold thereof to a predetermined magnitude; further means including a second input winding coupling said film for coincidently applying a field directed along the easy axis of said element having a magnitude less than the coercive force threshold thereof but in excess of the predetermined magnitude of lowered coercive force threshold to switch the material thereof from one to another stable remanent state; and an output winding coupling said device in quadrature to said first input winding for manifesting an output signal indicative of the switching of the material from one to another of said stable remanent states.

18. A magnetic data storage device comprising, a central core in the form of a tubular substrate, a peripheral coating of ferromagnetic material on said substrate exhibiting a circumferential easy axis of magnetization and a normal coercive force switching theshold, a first input winding wound about the periphery of said device for applying a field directed transverse with respect to the easy axis thereof having a magnitude sufficient to lower the normal coercive force threshold thereof to a predetermined switching threshold when energized, a second input winding wound about the material of said device in quadrature to said first winding for applying a field directed along the easy axis of said device having a magnitude less than the normal switching threshold thereof but in excess of said predetermined switching threshold when energized, an output winding coupling the material of said device in quadrature to said first input winding, and means for coincidently energizing both said first and second input windings to change the magnetization of said device from one to another stable direction along the easy axis thereof to thereby induce a signal on said output winding.

References Cited in the file of this patent

UNITED STATES PATENTS 2,877,540 Austen ---------------- Mar. 17, 1959

2,878,463 Austen ---------------- Mar. 17, 1959
2,882,519 Walentine et al. -------- Apr. 14, 1959
3,030,612 Rubens et al. ---------- Apr. 17, 1962

OTHER REFERENCES

Publication 1, "Nondestructive Sensing of Magnetic Cores," Communications and Electronics, January 1954, pages 822–830.

Publication 2, "The Nondestructive Read-Out of Magnetic Cores," (Papaulis), Proceedings of the I.R.E., August 1954, pages 1283–1288.

UNITED STATES PATENT OFFICE

CERTIFICATE OF CORRECTION

June 11, 1963

Patent No. 3,093,818

Lloyd P. Hunter

It is hereby certified that error appears in the above numbered patent requiring correction and that the said Letters Patent should read as corrected below.

Column 2, lines 38 and 39, for "anisotrophy" read -- anisotropy --; column 16, line 67, for "associated with" read -- inductively coupled to --.

Signed and sealed this 7th day of April 1964.

(SEAL)
Attest:

ERNEST W. SWIDER

Attesting Officer

EDWARD J. BRENNER

Commissioner of Patents